(12) United States Patent
Stackpoole et al.

(10) Patent No.: US 8,409,491 B1
(45) Date of Patent: Apr. 2, 2013

(54) IN-SITU FORMATION OF REINFORCEMENT PHASES IN ULTRA HIGH TEMPERATURE CERAMIC COMPOSITES

(75) Inventors: Margaret M Stackpoole, Santa Clara, CA (US); Matthew J Gasch, Sacramento, CA (US); Michael W Olson, Sunnyvale, CA (US); Ian W. Hamby, Seattle, WA (US); Sylvia M Johnson, Piedmont, CA (US)

(73) Assignee: The United States of America as Represented by the Administrator of the National Aeronautics & Space Administration (NASA), Washington, DC (US)

( * ) Notice: Subject to any disclaimer, the term of this patent is extended or adjusted under 35 U.S.C. 154(b) by 0 days.

(21) Appl. No.: 13/215,206

(22) Filed: Aug. 22, 2011

Related U.S. Application Data

(62) Division of application No. 11/864,471, filed on Sep. 28, 2007, now abandoned.

(51) Int. Cl.
| | |
|---|---|
| *B28B 1/00* | (2006.01) |
| *B28B 3/00* | (2006.01) |
| *B28B 5/00* | (2006.01) |
| *C04B 33/32* | (2006.01) |
| *C04B 35/00* | (2006.01) |
| *B32B 9/00* | (2006.01) |
| *B32B 19/00* | (2006.01) |

(52) U.S. Cl. ........ 264/624; 264/625; 264/626; 428/698; 428/699; 501/95.2; 501/96.2

(58) Field of Classification Search ................ 501/95.1, 501/95.2, 96.1, 96.2, 96.3; 428/447, 698, 428/699, 702, 704; 264/624–627, 642, 31
See application file for complete search history.

(56) References Cited

U.S. PATENT DOCUMENTS

| | | | |
|---|---|---|---|
| 4,885,265 A | 12/1989 | Hillig et al. | |
| 5,081,077 A * | 1/1992 | Tani et al. | 501/96.3 |
| 5,356,842 A * | 10/1994 | Yamakawa et al. | 501/87 |
| 6,146,559 A * | 11/2000 | Zank | 264/29.6 |
| 6,265,337 B1 | 7/2001 | Kukino et al. | |
| 6,287,714 B1 | 9/2001 | Xiao et al. | |
| 6,347,446 B1 | 2/2002 | Luthra et al. | |
| 6,350,713 B1 | 2/2002 | Petrak | |
| 6,403,210 B1 | 6/2002 | Stuivinga et al. | |
| 6,641,918 B1 | 11/2003 | Sherman et al. | |
| 6,838,162 B1 | 1/2005 | Gruber et al. | |
| 6,847,699 B2 | 1/2005 | Rigali et al. | |
| 6,899,777 B2 | 5/2005 | Vaidanathan et al. | |
| 6,913,827 B2 | 7/2005 | George et al. | |
| 6,995,103 B2 | 2/2006 | Aghajanian | |
| 7,238,219 B2 | 7/2007 | Xiao et al. | |
| 2002/0165332 A1 * | 11/2002 | Pope et al. | 528/25 |

OTHER PUBLICATIONS

Office Action-nonfinal rejection, mailed May 3, 2010, in parent case, U.S. Appl. No. 11/864,471, filed Sep. 28, 2007.

(Continued)

*Primary Examiner* — Kaj K Olsen
*Assistant Examiner* — Noah Wiese
(74) *Attorney, Agent, or Firm* — John F. Schipper; Robert M. Padilla; Christopher J. Menke

(57) ABSTRACT

A tough ultra-high temperature ceramic (UHTC) composite comprises grains of UHTC matrix material, such as $HfB_2$, $ZrB_2$ or other metal boride, carbide, nitride, etc., surrounded by a uniform distribution of acicular high aspect ratio reinforcement ceramic rods or whiskers, such as of SiC, is formed from uniformly mixing a powder of the UHTC material and a pre-ceramic polymer selected to form the desired reinforcement species, then thermally consolidating the mixture by hot pressing. The acicular reinforcement rods may make up from 5 to 30 vol % of the resulting microstructure.

14 Claims, 5 Drawing Sheets

OTHER PUBLICATIONS

Response to Office Action-nonfinal rejection, mailed May 3, 2010, in parent case, U.S. Appl. No. 11/864,471, filed Sep. 28, 2007. Response filed Oct. 12, 2010.

Office Action-final rejection, mailed Dec. 27, 2010, in parent case, U.S. Appl. No. 11/864,471, filed Sep. 28, 2007.

S.R. Levine et al., "Characterization of an Ultra-High Temperature Ceramic Composite", NASA/TM-2004-213085, May 2004, 28 pages.

* cited by examiner

IN-SITU FORMATION OF REINFORCEMENT PHASES IN ULTRA HIGH TEMPERATURE CERAMIC COMPOSITES

STATEMENT REGARDING FEDERALLY SPONSORED RESEARCH OR DEVELOPMENT

The invention described herein was made in the performance of work under NASA contract nos. NNA 04BC25C and NNA 05CS57A and is subject to Public Law 96-517 (35 U.S.C. 200 et seq.). The contractor has not elected to retain title to the invention.

TECHNICAL FIELD

The invention generally relates to ceramic compositions and processes of obtaining a ceramic product, especially ultra-high temperature ceramics. The invention more particularly relates to consolidated ceramic composites comprising a microstructure of a ceramic matrix incorporating a reinforcing ceramic phase, with emphasis on processes of obtaining uniform distribution of the reinforcing phase and controlling the growth of these phases.

BACKGROUND ART

The potential of various materials for use on reusable space transport vehicles with sharp leading edges is being investigated. The sharp leading edges (e.g., at the nose and wing edges) of these vehicles will experience significantly higher heating (to greater than 2000° C.) during hypersonic flight compared to the heating (~1650° C.) at the relatively blunt leading edges of the current space shuttle orbiters. This requires the development of new materials that are capable of reliably withstanding these high temperatures, including resisting oxidation and maintaining high mechanical strength at such temperatures, as well as withstanding the stresses from large spatial temperature differentials or sudden changes in temperature (improved thermal shock properties). A high thermal conductivity is also preferable, since it allows the heat energy to conduct through the material away from the hottest zones and to be re-radiated through cooler surfaces.

Ultra high temperature ceramics (UHTC), which are composed primarily of metal borides, carbides and nitrides, oxides or silicides, and especially of refractory metal diborides, are candidate materials for the sharp leading edges on hypersonic re-entry vehicles. UHTCs are a family of ceramic materials with very high melting temperatures and reasonable oxidation resistance in re-entry environments. Ground based arc-jet testing has demonstrated their potential for applications at temperatures approaching 2200° C.

However, there is concern regarding the mechanical properties and reusability of UHTC materials, in particular their low thermal shock resistance and low fracture toughness (resistance to crack propagation). Monolithic UHTCs are of concern because of their low fracture toughness and brittle behavior, leading to the possibility of sudden catastrophic failure of the material in the extreme re-entry environment. Future generation materials for use on space transport vehicles require substantial improvements in material properties, leading to increased reliability and safety. It is yet to be determined if UHTCs can be made to possess the properties necessary to reliably withstand the extreme environments experienced at the leading edges during re-entry without undergoing some recession, oxidation or thermal shock.

UHTC composites are being investigated as a possible approach to overcome the mechanical deficiencies of monolithic UHTCs. Mechanisms responsible for enhanced toughness in ceramic composites include crack deflection, crack bridging and microcracking. It is also known that high aspect ratio microstructures can lead to enhanced performance. The mechanical performance of ceramics in general would benefit from a high aspect ratio reinforcement phase. Previous work in other ceramic systems has shown that these mechanisms can result in a fracture toughness of 10 to 30 MPa$\sqrt{m}$, compared to typical values of only 2 to 6 MPa$\sqrt{m}$ in monolithic materials.

A small grain size, high aspect ratio, uniform distribution and random orientation of the reinforcing microstructures are very important for attaining the best performance from a ceramic composite. Mixing the reinforcement phase in powder form with the matrix phase (also in powder form) prior to thermal consolidation sacrifices each of these desired characteristics to some extent, as the resulting microstructure of the consolidated material has larger and rounder grains than desirable, sufficiently uniform mixing is difficult to achieve.

Early efforts with hot pressed $HfB_2$: 20 vol % SiC focused mainly on improving homogeneity in the resulting microstructure and on characterizing its baseline properties. The SiC reinforcement material was found to promote refinement of the microstructure in comparison with monolithic $HfB_2$ material, but also to decrease the thermal conductivity. Additionally, more SiC was not necessarily better from an oxidation standpoint.

U.S. Pat. No. 6,146,559 to Zank describes preparing titanium diboride ceramics by mixing titanium diboride powder with a pre-ceramic organosilicon polymer, then molding and sintering under pressure to achieve high density in these systems.

In NASA Technical Memo NASA/TM-2004-213085, S. Levine et al., "Characterization of an Ultra-High Temperature Ceramic Composite" (NASA Glenn Research Center, Cleveland Ohio, May 2004), a UHTC composite plate was produced from eleven plies of carbon fabric alternately coated with a SiC/AHPCS (allylhydrido-polycarbosilane) slurry and a $HfB_2$/AHPCS slurry. The coated cloth was pressed in a mold to 12 MPa, cured under inert gas to 400° C., then fired to 850° C. under inert gas to pyrolyse the AHPCS.

Kuntz et al., "Properties and Microstructure of Alumina-Niobium Nanocomposites Made by Novel Processing Methods", Ultrafine Grained Materials II, TMS 2002, pp. 225-234, indicates that the addition of refractory metals, such as niobium, to ceramic structures made by spark plasma sintering can more than double fracture toughness to greater than 6 MPa$\sqrt{m}$ with only marginal decrease in hardness.

U.S. Pat. No. 6,287,714 to Xiao et al., a WC/Co cermet system has a BN grain growth inhibitor incorporated by spray drying a poly-urea-boron precursor onto the WC powder prior to densification. The resulting nanostructure material has increased toughness to 15-30 MPa$\sqrt{m}$ with the grain growth inhibitor added.

An effective way to incorporate the microstructures into the ceramic composite is needed if optimum fracture toughness is to be attained.

SUMMARY DISCLOSURE

We obtain a uniform distribution of high-aspect-ratio reinforcement microstructures in UHTC materials by means of in-situ growth during thermal consolidation processing. In particular, to obtain the in-situ grown reinforcement phases, one component of the ceramic composite system is added as a pre-ceramic polymer. During powder preparation, the pre-ceramic polymer phase is uniformly distributed throughout the powder phases and coats the powder grains uniformly. Additional ceramic or refractory metal phases may also be uniformly incorporated. A traditional thermal consolidation step (such as hot pressing or spark plasma sintering) is employed, and no extra steps are necessary to obtain the reinforcement growth. Optimized hot pressing parameters are needed to achieve sufficient high aspect ratio phase growth. Optimized hot pressing parameters will differ for each material system evaluated The reinforcement species forms as acicular rods or needle-like whiskers or filaments having a high aspect ratio, as well as uniform distribution and random orientation throughout the ceramic matrix. The ceramic composite comprises a consolidated mass of grains of UHTC material (e.g. $HfB_2$ or $ZrB_2$) surrounded by a uniform distribution of acicular reinforcement ceramic rods having an aspect ratio of at least 10:1.

The reinforcement phase imparts increased mechanical properties that lead to improved thermal shock resistance, while the UHTC matrix provides a high temperature material with reasonable oxidation properties in re-entry conditions. Initial characterization of these systems has demonstrated that crack deflection along the matrix-reinforcement interface is observed, yielding a system of improved fracture toughness over the baseline system, leading to improved mechanical performance. Initial indentation experiments on the resulting material have shown that cracks deflect at the reinforcements and grow along the reinforcement-matrix interface, indicating a system of enhanced fracture toughness compared to monolithic UHTC material. The reinforced composites should therefore reduce the risk of catastrophic failure over current UHTC systems. These high aspect ratio reinforced composites yield improved material properties, including fracture toughness and thermal shock resistance, thus offering better alternatives in microstructure to the current UHTC systems proposed for sharp leading edge applications.

BRIEF DESCRIPTION OF THE DRAWINGS

FIG. 1 represents a prior art $HfB_2$: SiC microstructure formed from powdered $HfB_2$ and powdered SiC. FIGS. 2 and 3 represent experimental results of processing a $HfB_2$—SiC composition with pre-ceramic polymer, but not in accord with the present invention. FIGS. 4-8 show UHTC microstructures in accord with the present invention. FIGS. 4-7 represent experimental results of processing a $HfB_2$—SiC composition with varying SiC volume fraction (FIG. 4: vol % SiC is 5%, FIG. 5: vol % SiC is 10%, FIG. 6: vol % SiC is 15%, FIG. 7: vol % SiC is 30%.) FIG. 8 represents experimental results of processing a $ZrB_2$—SiC composition.

DETAILED DESCRIPTION

Figure 1:
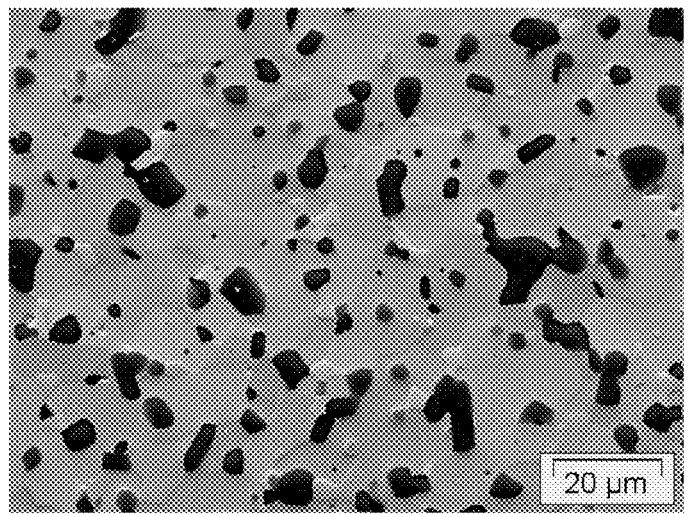
FIGS. 1-8 are magnified images of UHTC materials containing SiC.

The preparation of the enhanced UHTC composite system begins with a powder assembly of grains of one or more selected inorganic metal compounds (MC). The desired ceramic matrix is composed essentially of metal borides, carbides, nitrides, oxides, silicides, borocarbides, boronitrides, carbonitrides, or oxynitrides, especially of the group IV to VI refractory metals, having melting temperatures of at least 2000° C. Exemplary materials include $HfB_2$, $ZrB_2$, $TaB_2$, $TiB_2$, TaC, HfC, NbC, TiC, ZrC, HfN, $Ta_2N$, and ZrN. Choice of material will depend on the intended application. For thermal protection systems on space transport vehicles, the material should have both good oxidation resistance and an extremely high melting point (e.g, near 3000° C. or higher). Hafnium and zirconium diborides are preferred candidates for use on space transport vehicles. The ceramic starting powders are milled to the desired starting size.

A second compound, a pre-ceramic polymer, is added that will form a small volume fraction (5 to 30 vol %) of the high-aspect-ratio reinforcement phase in the ceramic composite. The volume fraction should be selected to optimize one or more thermal or mechanical properties of the resultant composite material, such as its thermal conductivity, fracture toughness, thermal shock or hardness. The particular pre-ceramic polymer is selected according to the desired reinforcement species. For example, any of several available organosilicon polymers, including a polycarbosilane, polysiloxane, polysilazane, polyborosiloxane, or polyborosilazane compounds may be used to grow SiC or $Si_3N_4$, possibly in combination with $B_4C$ or BN, in the ceramic matrix.

The pre-ceramic polymer compound is uniformly mixed with the refractory ceramic powder in order to coat the grains. Good mixing disperses the polymer evenly throughout the mass, resulting in a homogeneous microstructure and the desired mechanical properties in the final ceramic composite. If the pre-ceramic polymer is not mixed sufficiently to uniformly distribute the polymer throughout the refractory ceramic powder, then regions deficient in the polymer will lead to larger grains of the ceramic matrix (undesirable). If desired, a fine powder of the selected reinforcement species could also be added along with the pre-ceramic polymer in order to act as seed crystals for acicular reinforcement growth, but uniform distribution of that powder will be important to the uniformity of the grown reinforcement material.

One preferred method of ensuring uniform mixing of the pre-ceramic polymer with the ceramic powder is to create a slurry containing the ceramic powder, the pre-ceramic polymer and a compatible solvent. The slurry is fed through a nozzle that produces uniform droplets of the suspension that are captured in liquid nitrogen. The droplets are then freeze dried to remove the solvent, leaving a uniform mixture of the powder coated with the pre-ceramic polymer.

The mixture is packed in graphite dies and thermally processed using the same basic consolidation steps (such as hot pressing) that are employed in traditional UHTC processing. The heating and cooling can be controlled according to a desired schedule. In hot pressing, a more rapid heating and cooling schedule results in a finer grain structure, compared to a slower schedule. For optimum acicular reinforcement growth, a slower heating and cooling rate is preferred.

Typical pressures during hot pressing are in a range of 10 to 40 MPa (or 100 to 400 $kgf/cm^2$), depending on the desired volume reduction and void content of the resulting sintered body. The mixture is treated at 1800 to 2150° C. for 30 to 90 minutes, and then the ceramic is allowed to cool. Hot pressing temperatures will depend upon the particular ceramic system being consolidated. For example, systems processed with $HfB_2$ have a minimum processing temperature of 2050° C. with a minimum dwell time of 30 minutes. Systems processed with $ZrB_2$ have a minimum processing temperature of 1950° C. with a minimum dwell time of 30 minutes. In this manner, the heated pre-ceramic polymer undergoes an in situ chemical reaction that grows the desired reinforcement material around the matrix grains.

Where the temperature is decreased relatively slowly (e.g., over a 180 minute interval), the resulting material is an assembly of MC domains with acicular crystal rods (long, narrow, often pointed) of the reinforcement species, having an aspect ratio of the order of from 10:1 to 30:1 with randomly distributed directions. Where the temperature is decreased relatively quickly (e.g., by quenching), the resulting material is an assembly of fine grain MC domains and reinforcement grains having aspect ratios estimated as no greater than about 2:1.

The length of the acicular crystal rods or whiskers (20 to 30 μm) does not vary appreciably with volume fraction. The amount of reinforcing material does affect the number and thickness of the acicular rods. A higher volume fraction promotes higher diameter rods, with, for example, a 10 vol % of SiC yielding rod diameters on the order of 2 μm and a 15 vol % of SiC yielding rod diameters on the order of 5 μm. 20 vol % (or greater) results in a 3D network of rods that are at least partly connected to each other so as to trap the MC grains within the network of reinforcing rods. The microstructure of a composite with 20 vol % of SiC exhibits a majority of the SiC material coalesced as larger grains, but the high aspect ratio of the SiC is preserved and some finer acicular SiC grains are still evident.

Hot pressed test samples with 5, 10, 15 and 20 vol % SiC in $HfB_2$ indicate full density is achieved in samples with SiC vol % greater than 5%. It was also observed that increasing the SiC vol % results in increased toughness and for a comparable vol % of SiC the high aspect ratio UHTC has a higher toughness than the baseline UHTC system indicating that the reinforcements are enhancing toughness. Inspection of the 15 vol % sample after subject to toughness testing shows evidence of crack deflection along the acicular SiC—$HfB_2$ interfaces, as well as possible crack bridging between SiC grains, to account for the increased toughness. Preliminary work on a $ZrB_2$: 15 vol % SiC composite system likewise obtains a high aspect ratio SiC phase. The reduction in needed SiC to maintain toughness, obtained from the acicular growth, promises to enhance the composite's oxidation resistance, as arc jet testing of SiC-containing composites lead to SiC depletion near the surface if the vol % SiC is above the percolation threshold.

EXAMPLES

FIG. 1 shows a baseline hot pressed UHTC microstructure of $HfB_2$: 20 vol % SiC formed from powdered $HfB_2$ and SiC. It can be seen that this known UHTC system does not have high aspect ratio SiC reinforcements.

Figure 2:
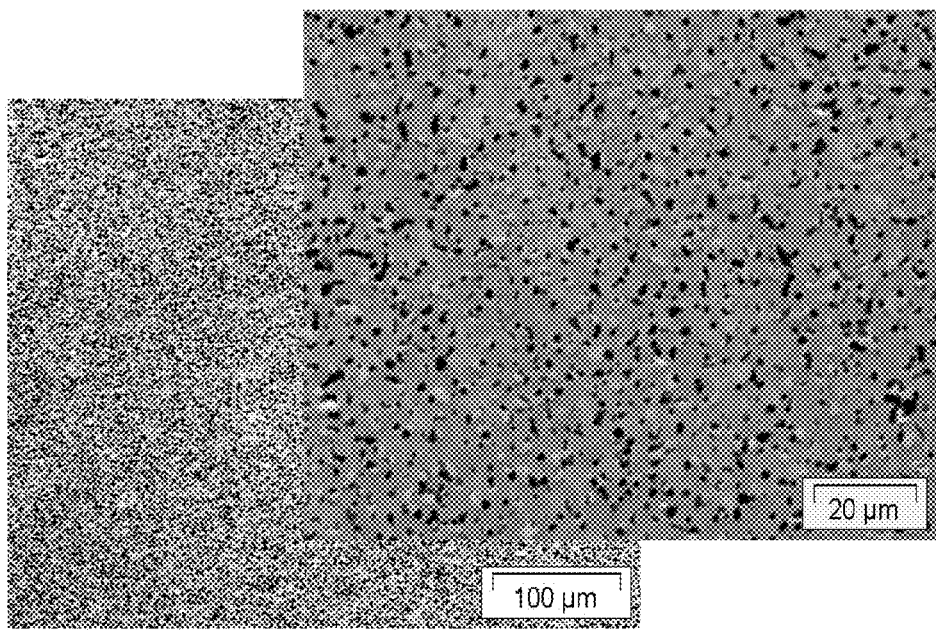

FIG. 2 shows a spark plasma sintered (SPS) UHTC microstructure of $HfB_2$: 10 vol % SiC formed from a mixture of powdered $HfB_2$ and a pre-ceramic polymer. The SPS process pulses electric current through a graphite die containing the ceramic mixture, thus generating heat internally at a very fast rate. It can be seen in FIG. 2 that this SPS processing results in a very refined microstructure, but no evidence of acicular reinforcing grains.

Figure 3:
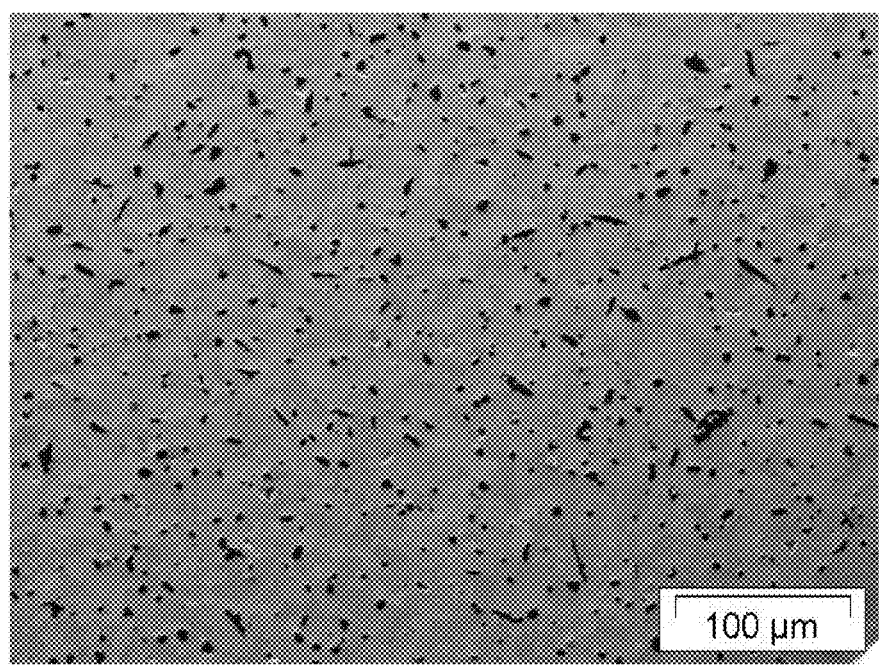
Figure 4:
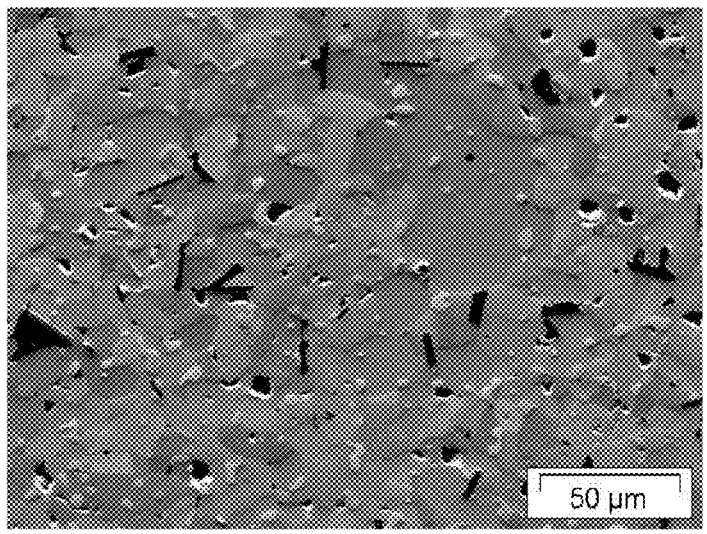
Figure 5:
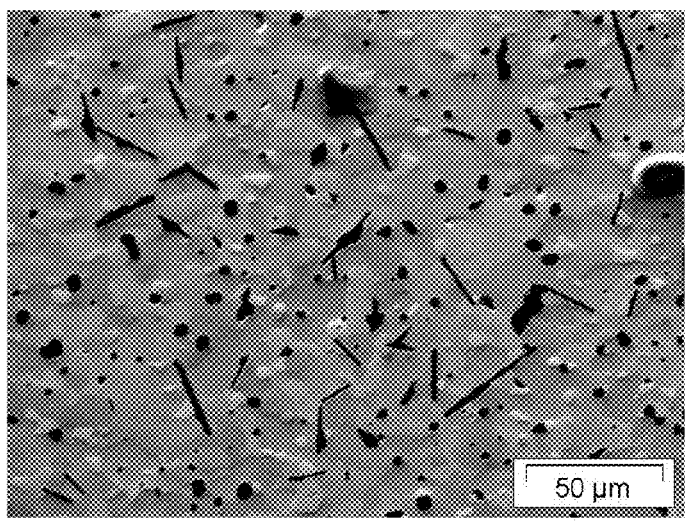

FIG. 3 shows hot pressed microstructure of $HfB_2$: 10 vol % SiC formed from a mixture of powdered $HfB_2$ and a pre-ceramic polymer, but at a dwell time of less than the minimum 30 minutes. It can be seen that short hot pressing times result in few acicular grains.

Figure 6:
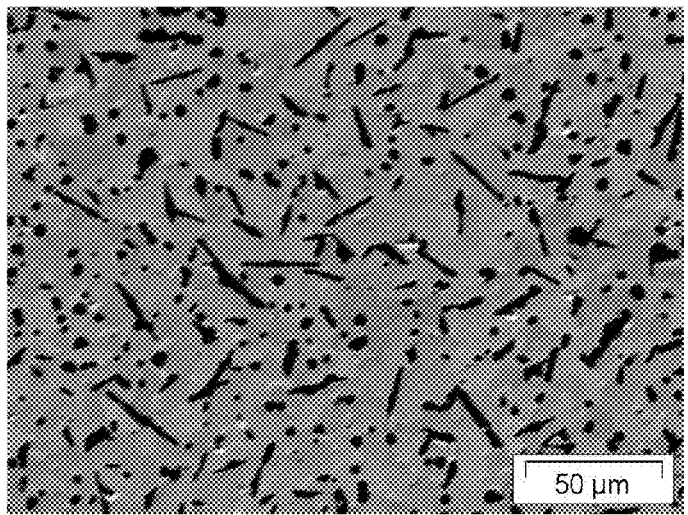
Figure 7:
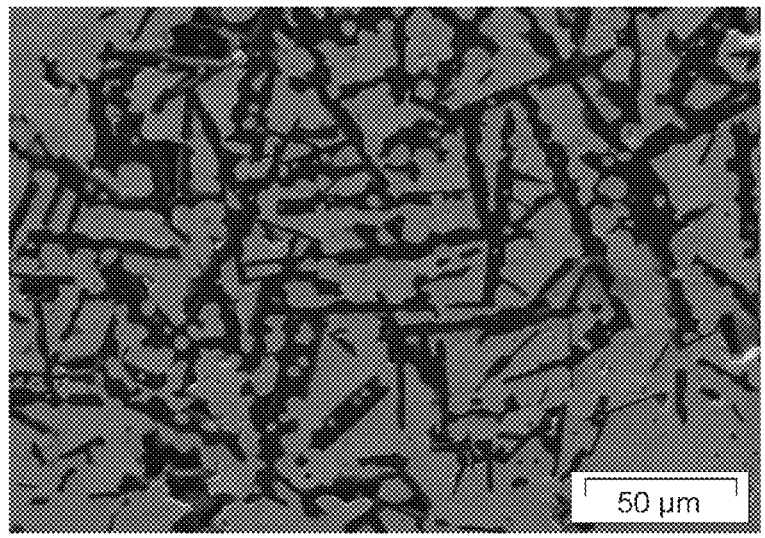

FIGS. 4-7 show hot pressed microstructures of $HfB_2$: SiC formed from a mixture of powdered $HfB_2$ and a pre-ceramic polymer, with the pre-ceramic polymer added in amounts that respectively yield 5, 10, 15 and 20 vol % of SiC in the $HfB_2$ matrix. In accord with the invention, the thermal processing in these samples was performed with longer dwell times of one hour. Many acicular rods can be seen, with the number of acicular rods increasing with the volume of SiC. It is also seen that one can adjust the volume percentage of SiC in the UHTC without losing the high aspect ratio architecture. The aforementioned dimensional characteristics of the high aspect ratio reinforcing rods are evident in FIGS. 4-7. An interconnected network of SiC is observed beginning at 20 vol %, as seen in FIG. 7. The majority of SiC rods have coalesced to form larger grains, but some finer acicular rods are also evident.

Figure 8:
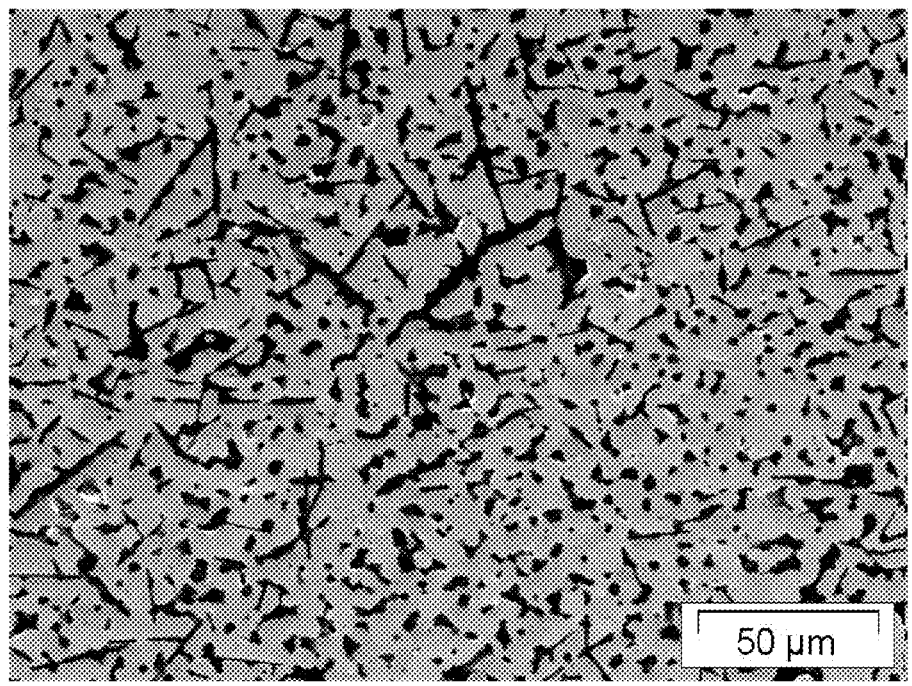

FIG. 8 shows a hot pressed microstructure of $ZrB_2$: 15 vol % SiC formed from a mixture of powdered $ZrB_2$ and a pre-ceramic polymer in accord with the present invention. The same acicular SiC rods as in the $HfB_2$ systems are observed here as well.

Figure 9:
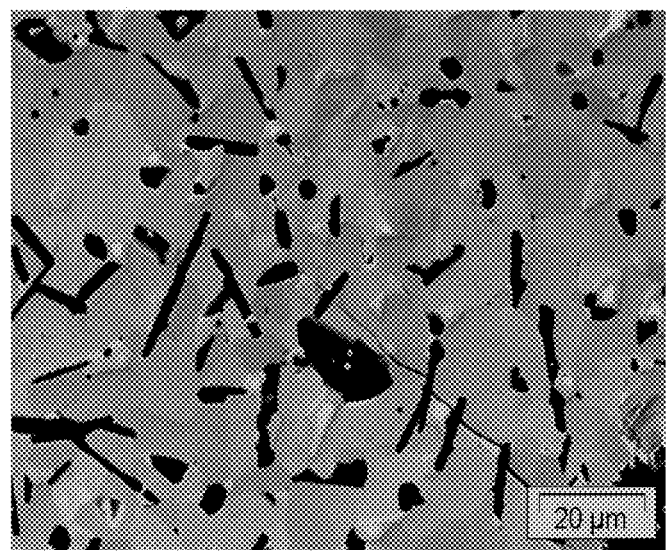
FIG. 9 is a magnified image of a UHTC material of the present invention as in FIG. 6 after fracture toughness testing.
Figure 10:
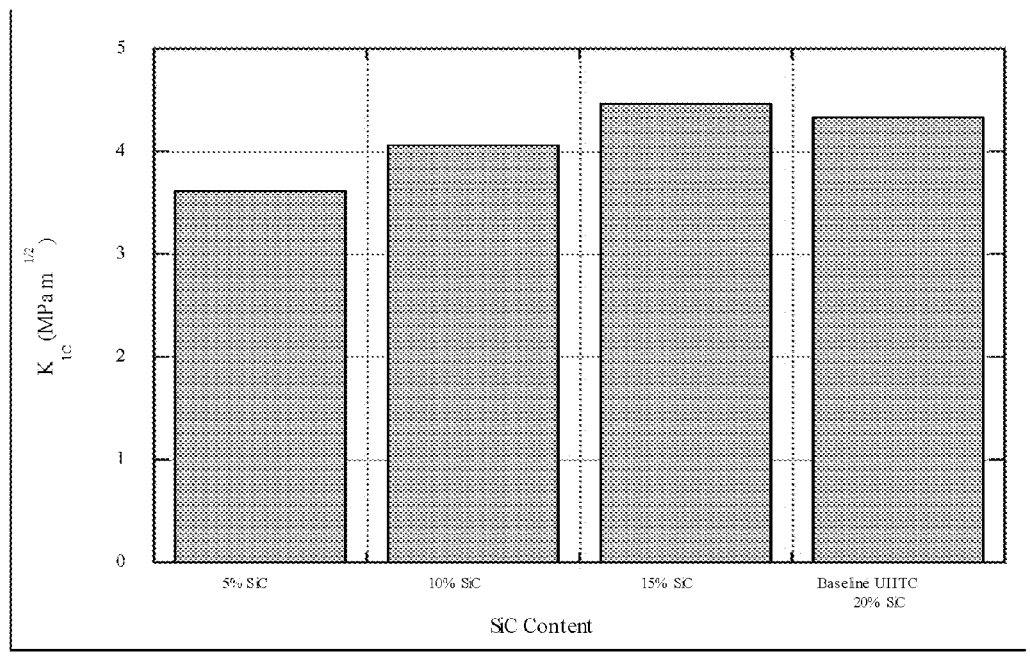
FIG. 10 is a bar chart showing data resulting from fracture toughness testing of UHTC materials of the present invention as in FIGS. 4-6 and a comparison baseline UHTC material of the prior art as in FIG. 1.

FIG. 9 shows the $HfB_2$: 15 vol % SiC microstructure of FIG. 6 after having undergoing fracture toughness testing using an indentation approach. A crack is seen in the lower right portion of the image extending from a corner of the indent. The image evidences crack growth along the $HfB_2$—SiC interface with possible SiC grain bridging. The data (FIG. 10) show that a 15% volume fraction of high aspect ratio SiC has toughness comparable to the baseline particulate composite of 20% SiC.

What is claimed is:

1. A method of forming a ceramic composite, the method comprising:
   mixing a pre-ceramic polymer and a solvent into a powder of an ultra-high-temperature ceramic (UHTC) material, and allowing the pre-ceramic polymer to coat grains of the UHTC material approximately uniformly, wherein the process of mixing comprises:
   (i) creating a slurry comprising the powder of the UHTC material, the pre-ceramic polymer and the solvent;
   (ii) producing droplets of the slurry; and
   (ii) removing or separating at least a portion of the solvent from the slurry,
   wherein said UHTC material is a boron-containing material, comprising at least one of $HfB_2$ and $ZrB_2$ and having a melting temperature of at least 2000° C.;
   thermally consolidating the mixture at a consolidation temperature of at least about 2000° C. for a thermal consolidation time interval in a range of about 30-180 minutes and at an applied pressure of at least 10 MPa; and
   allowing acicular reinforcement rods or fibers or whiskers to grow from the UHTC grains during thermal consolidation.

2. A method of forming a ceramic composite, the method comprising:
   mixing a pre-ceramic polymer and a solvent into a powder of an ultra-high-temperature ceramic (UHTC) material, and allowing the pre-ceramic polymer to coat grains of the UHTC material approximately uniformly, wherein the process of mixing comprises:
   (i) creating a slurry comprising the powder of the UHTC material, the pre-ceramic polymer and the solvent;
   (ii) producing droplets of the slurry; and
   (ii) removing or separating at least a portion of the solvent from the slurry;
   thermally consolidating the mixture at a consolidation temperature of at least about 1800° C. for a thermal consolidation time interval in a range of about 30-180 minutes and at an applied pressure of at least 10 MPa; and
   allowing acicular reinforcement rods or fibers or whiskers to grow from the UHTC grains during thermal consolidation, wherein at least one of the acicular reinforcement rods or fibers or whiskers has an aspect ratio of at least 10:1.

3. The method as in claim 1, wherein said pre-ceramic polymer is selected one or more of a polycarbosilane, polysiloxane, polysilazane, polyborosiloxane, or polyborosilazane compound.

4. The method as in claim 1, wherein said acicular reinforcement ceramic rods or fibers or whiskers comprise one or more of SiC, $Si_3N_4$, $B_4C$ or BN.

5. The method as in claim 1, wherein said grown acicular reinforcement ceramic rods or fibers or whiskers have a volume fraction of not more than about 20 volume percent in said thermally consolidated mixture.

6. The method as in claim 1, wherein said thermal consolidation process comprises hot pressing.

7. The method as in claim 1, further comprising uniformly distributing an additional refractory ceramic phase into said powder of UHTC material to form a new mixture, before thermally consolidating the new mixture.

8. The method of claim 1, further comprising producing said droplets of said slurry by passing said slurry through a nozzle.

9. The method of claim 1, further comprising thermally consolidating said mixture at a temperature of no more than about 2150° C.

10. The method of claim 1, further comprising consolidating said mixture at an applied pressure of no more than about 40 MPa.

11. The method of claim 1, further comprising thermally consolidating said mixture for said consolidation time interval in a range of about 30-90 minutes.

12. The method of claim 1, further comprising thermally consolidating said mixture for said consolidation time interval of about 180 minutes and allowing said consolidated mixture to form as an assembly of fine grain domains, with at least one of said reinforcement rods or fibers or whiskers having an aspect ratio of no more than about 2:1.

13. The method of claim 1, further comprising:
choosing said UHTC material to comprise $HfB_2$; and
thermally consolidating said mixture at a temperature of at least about 2050° C. for a time interval of at least about 30 minutes.

14. The method of claim 1, further comprising:
choosing said UHTC material to comprise $ZrB_2$; and
thermally consolidating said mixture at a temperature of at least about 1950° C. for a time interval of at least about 30 minutes.

* * * * *